J. L. LA DRIERE.
EXTERNAL GUARD FOR PNEUMATIC TIRES.
APPLICATION FILED JAN. 21, 1910.
956,110.
Patented Apr. 26, 1910.
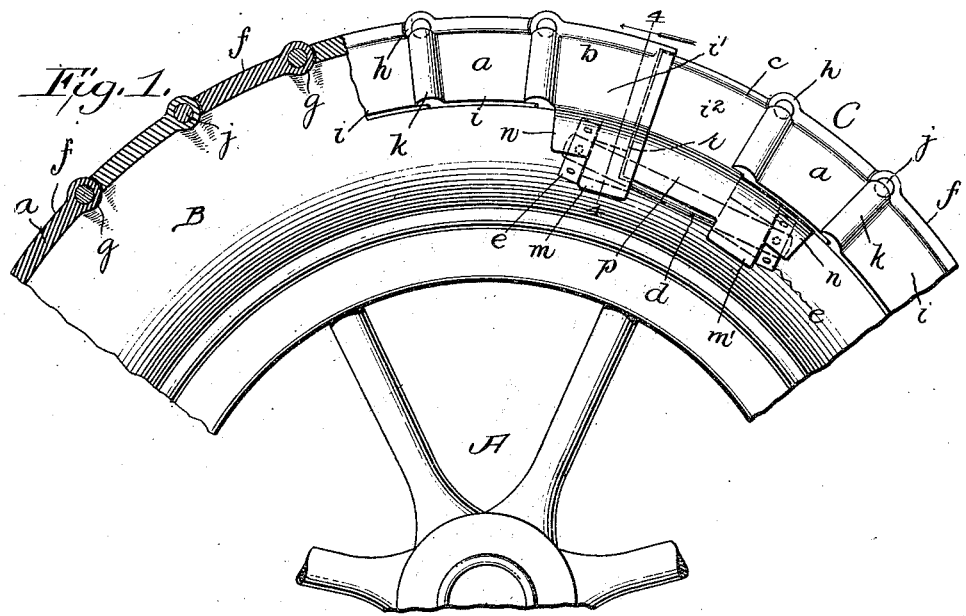
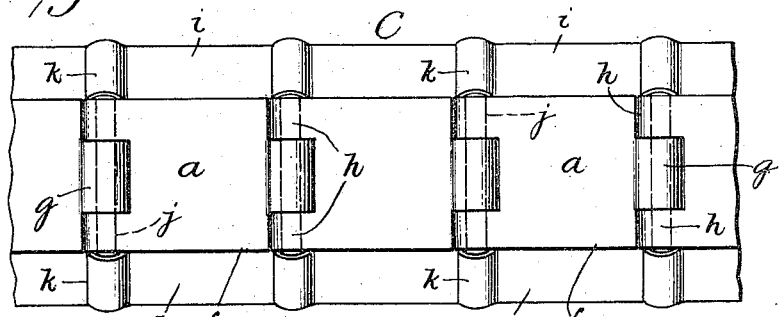
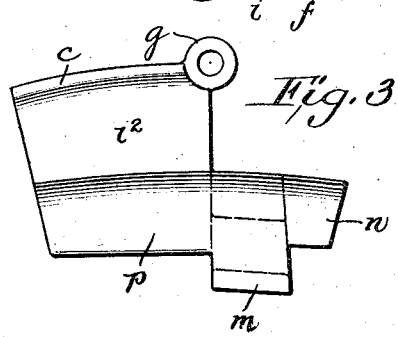
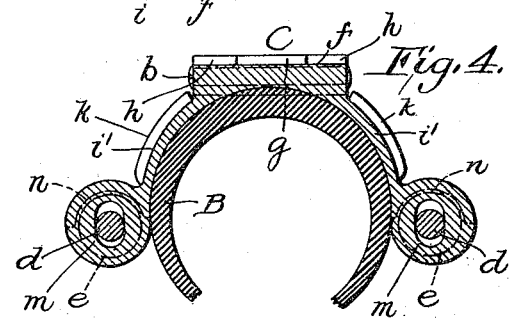
WITNESSES
INVENTOR
J. L. LaDriere
by James J. Sheehy
Attorney

UNITED STATES PATENT OFFICE.

JOSEPH L. LA DRIERE, OF ALBUQUERQUE, TERRITORY OF NEW MEXICO.

EXTERNAL GUARD FOR PNEUMATIC TIRES.

956,110.  Specification of Letters Patent.  Patented Apr. 26, 1910.

Application filed January 21, 1910. Serial No. 539,360.

*To all whom it may concern:*

Be it known that I, JOSEPH L. LA DRIERE, citizen of the United States, residing at Albuquerque, in the county of Bernalillo and Territory of New Mexico, have invented new and useful Improvements in External Guards for Pneumatic Tires, of which the following is a specification.

My present invention has to do with external guards or armors for pneumatic tires; and it seeks to provide a flexible armor that is readily applicable to and removable from a pneumatic tire, is efficient in protecting a tire against wear and puncture, and is provided with hinges the knuckles of which are adapted to engage the tire with a view of preventing creeping of the armor on the tire and are also adapted to engage the ground with a view of increasing the traction capacity of the armor.

With the foregoing in mind the invention in all of its details will be fully understood from the following description and claim when the same are read in connection with the drawings, accompanying and forming part of this specification, in which:

Figure 1 is a side elevation, partly in section, of a portion of my novel guard as the same appears when properly positioned on a wheel tire. Fig. 2 is a plan view of a portion of the guard. Fig. 3 is an enlarged side elevation of one of the end sections. Fig. 4 is a transverse section taken in the plane indicated by the line 4—4 of Fig. 1.

Similar letters designate corresponding parts in all of the views of the drawings, referring to which:

A is a portion of a wheel. B is a pneumatic tire thereon, and C is my novel guard as a whole. The said guard comprises a plurality of sections $a$, hinged together, an end section $b$ hinged to an adjacent section $a$, an end section $c$ hinged to an adjacent section $a$, and threaded bolts $d$ and nuts $e$ through the medium of which the end sections $b$ and $c$ are adjustably connected together. In this manner an endless chain or ring is formed calculated to entirely surround the tire.

Each of the sections $a$ included in the guard C is preferably formed of steel and comprises a longitudinal central portion $f$, a knuckle $g$ at one end thereof, knuckles $h$ arranged at the opposite end of the portion $f$ and separated by an intervening space, and curvilinear skirts $i$ extending from opposite sides of the portion $f$. The several sections $a$ are connected in the hinged manner illustrated—that is to say, the knuckle $g$ of each is arranged between the knuckles $h$ of an adjacent section, and pintles $j$ are secured in the alined knuckles $g$ and $h$; the said pintles being preferably headed at their opposite ends, as clearly shown in Figs. 1 and 2. By virtue of this construction it will be manifest that the guard is provided with the flexibility necessary to enable it to lend itself to movements of the tire B; and it will also be manifest that the inwardly extending portions of the alined knuckles $g$ and $h$ will serve to engage the tire and prevent creeping of the guard thereon, while the exterior portions of the said alined knuckles will, by engaging the ground, increase the traction capacity of the guard.

As will be readily understood from Figs. 1 and 2, each of the skirts $i$ is provided at one end with an offset flange $k$ that is adapted to lap the opposed unflanged end of an adjacent skirt, this in order to increase the protection afforded by the skirts to the side portions of the tire without detracting from the flexibility of the guard as a whole.

Each of the end sections $b$ and $c$ is hinged in the manner described to an end section $a$, and the end section $b$ is provided with skirts $i'$ having offset flanges $k$ designed to lap the opposed ends of the skirts $i$ on the adjacent section $a$, while the end section $c$ is arranged to slide lengthwise as a whole under the section $b$; the inner side of the section $b$ being recessed for that purpose. The offset flanges $k$ on the skirts $i$ of the section $a$ that is hinged to the end section $c$ are arranged at the outer sides of the adjacent ends of the skirts on section $c$, as shown and for the purpose before set forth.

The skirts $i'$ of the end section $b$ are provided with apertured lugs $m$ and are also provided with guard flanges $n$, while the skirts $i^2$ of the end section $c$ are provided with apertured lugs $m'$ and guard flanges $n$ and $p$; the guard flanges $p$ being proportionately long and being designed to extend into recesses $r$ in the first named lugs $m$. The apertured lugs $n$ receive the threaded bolts $d$, of which there is one at each side of the tire, and mounted on said threaded bolts and arranged at the outer sides of the lugs $m$ are nuts $e$ through the medium of which slack of the guard C may be taken up to render the guard tight on the tire, or said guard may be increased in length so as to permit of its ready removal from the tire. It will also be observed that by manipulation of the nuts e, the guard may be expeditiously and easily fitted to tires of different sizes. The bolts and nuts being arranged within the guard flanges p and n, it follows that said bolts and nuts will be protected against injury by said flanges.

I have entered into a detailed description of the construction and relative arrangement of parts embraced in the present and preferred embodiment of my invention in order to impart a full, clear and exact understanding of the said embodiment, but it is obvious that in the future practice of the invention such changes or modifications may be made as do not involve departure from the scope of the invention as defined in the claim appended.

Having described my invention, what I claim and desire to secure by Letters-Patent, is:

In an external guard for pneumatic tires, the combination of a plurality of sections each of which has a longitudinal central portion, a knuckle at one end thereof, spaced knuckles at the opposite end of said longitudinal central portion, and curvilinear skirts extending from opposite sides of said portion and flanged at one end; transverse pintles extending through the alined knuckles of the sections and connecting the sections together in a hinged manner, an end section connected in a hinged manner to one of the first-named sections and having a longitudinal central portion and curvilinear skirts and also having apertured lugs and guard flanges on said skirts, a second end section hinged to another of the first-named sections and adapted to slide under the first-named end section and having a longitudinal central portion and curvilinear skirts and also having apertured lugs and guard flanges on said skirts, threaded bolts arranged inside the guard flanges and extending through the apertured lugs of the two end sections, and nuts arranged inside the guard flanges and mounted on the bolts at the outer sides of the apertured lugs, all substantially as specified.

In testimony whereof I have hereunto set my hand in presence of two subscribing witnesses.

JOSEPH L. LA DRIERE.

Witnesses:
GEORGE R. CRAIG,
FRANK H. MOORE.